US011933464B2

(12) United States Patent
Ji et al.

(10) Patent No.: US 11,933,464 B2
(45) Date of Patent: Mar. 19, 2024

(54) LIGHT STRIP

(71) Applicant: IDEAL Industries Lighting LLC, Durham, NC (US)

(72) Inventors: Winston Ji, Shanghai (CN); David P. Goelz, Milwaukee, WI (US); Ian Zhou, Shanghai (CN)

(73) Assignee: IDEAL Industries Lighting LLC, Durham, NC (US)

( * ) Notice: Subject to any disclaimer, the term of this patent is extended or adjusted under 35 U.S.C. 154(b) by 0 days.

(21) Appl. No.: 18/024,174

(22) PCT Filed: Sep. 7, 2020

(86) PCT No.: PCT/CN2020/113730

§ 371 (c)(1), (2) Date: Mar. 1, 2023

(87) PCT Pub. No.: WO2022/047775

PCT Pub. Date: Mar. 10, 2022

(65) Prior Publication Data

US 2023/0272891 A1 Aug. 31, 2023

(51) Int. Cl.
*F21S 4/28* (2016.01)
*F21V 5/04* (2006.01)
(Continued)

(52) U.S. Cl.
CPC .................. *F21S 4/28* (2016.01); *F21V 5/04* (2013.01); *F21Y 2103/10* (2016.08); *F21Y 2115/10* (2016.08)

(58) Field of Classification Search
CPC .......... F21S 4/28; F21V 5/04; F21Y 2103/10; F21Y 2115/10
See application file for complete search history.

(56) References Cited

U.S. PATENT DOCUMENTS

| | | | |
|---|---|---|---|
| 8,403,531 | B2 | 3/2013 | Negley et al. |
| D750,308 | S | 2/2016 | Rodgers et al. |

(Continued)

FOREIGN PATENT DOCUMENTS

| | | | |
|---|---|---|---|
| CN | 205402342 | U | 7/2016 |
| CN | 207880501 | U | 9/2018 |

(Continued)

OTHER PUBLICATIONS

English translation of Liang CN-208720133-U, published Apr. 2019 (Year: 2019).*

(Continued)

*Primary Examiner* — Evan P Dzierzynski
(74) *Attorney, Agent, or Firm* — Withrow & Terranova, P.L.L.C.

(57) ABSTRACT

A light strip that includes a housing with an elongated shape. A tray is attached to the housing and is positioned in the housing. An LED assembly is mounted to the tray and includes LED elements that emit light outward away from the tray. An elongated lens with a central section is configured to extend over the LED assembly. Inner end caps are positioned at ends of the lens with the inner ends caps being light-transmissive. Outer end caps are positioned at ends of the housing outward from the inner end caps with the outer end caps being opaque.

19 Claims, 14 Drawing Sheets

(51) Int. Cl.

| | |
|---|---|
| *F21Y 103/10* | (2016.01) |
| *F21Y 115/10* | (2016.01) |

(56) References Cited

U.S. PATENT DOCUMENTS

| | | | | |
|---|---|---|---|---|
| 9,285,084 | B2 * | 3/2016 | Amrine, Jr. | F21V 17/04 |
| D757,324 | S | 5/2016 | Rodgers et al. | |
| 9,822,951 | B2 | 11/2017 | Lu et al. | |
| 10,045,418 | B2 | 8/2018 | Kinnune et al. | |
| 10,100,988 | B2 | 10/2018 | Rodgers et al. | |
| 10,161,568 | B2 * | 12/2018 | Amrine, Jr. | F21V 23/023 |
| 10,323,824 | B1 | 6/2019 | Lim et al. | |
| 10,378,735 | B1 * | 8/2019 | Patel | F21V 19/004 |
| 10,584,860 | B2 | 3/2020 | Dungan et al. | |
| 10,612,727 | B1 * | 4/2020 | Green | F21K 9/20 |
| 10,612,747 | B2 | 4/2020 | Rodgers et al. | |
| D910,225 | S | 2/2021 | Bernard et al. | |
| 11,060,694 | B2 | 7/2021 | Tarsa et al. | |
| 2010/0002426 | A1 * | 1/2010 | Wu | F21V 21/005 362/217.1 |
| 2013/0119872 | A1 | 5/2013 | Chobot | |
| 2014/0001959 | A1 | 1/2014 | Motley et al. | |
| 2014/0001963 | A1 | 1/2014 | Chobot et al. | |
| 2014/0167620 | A1 | 6/2014 | Chobot | |
| 2014/0167622 | A1 | 6/2014 | Chobot et al. | |
| 2014/0167623 | A1 | 6/2014 | Chobot et al. | |
| 2014/0167642 | A1 | 6/2014 | Chobot | |
| 2014/0167653 | A1 | 6/2014 | Chobot | |
| 2014/0268790 | A1 | 9/2014 | Chobot et al. | |
| 2015/0008827 | A1 | 1/2015 | Carrigan et al. | |
| 2015/0102729 | A1 | 4/2015 | Creasman et al. | |
| 2017/0230364 | A1 | 8/2017 | Barile et al. | |
| 2018/0003351 | A1 | 1/2018 | Van Winkle | |
| 2019/0297295 | A1 | 9/2019 | Roberts et al. | |
| 2020/0271289 | A1 * | 8/2020 | Lang | F21S 4/28 |
| 2020/0352011 | A1 | 11/2020 | Barile et al. | |
| 2020/0408368 | A1 | 12/2020 | Lim et al. | |

FOREIGN PATENT DOCUMENTS

| | | | | |
|---|---|---|---|---|
| CN | 208418221 | U | | 1/2019 |
| CN | 208605969 | U | | 3/2019 |
| CN | 208720133 | U | * | 4/2019 |
| CN | 208720133 | U | | 4/2019 |
| CN | 209309745 | U | | 8/2019 |
| CN | 209839969 | U | | 12/2019 |
| CN | 211176433 | U | | 8/2020 |
| CN | 211289664 | U | | 8/2020 |

OTHER PUBLICATIONS

International Search Report and Written Opinion for International Patent Application No. PCT/CN2020/113730, dated May 26, 2021, 9 pages.

* cited by examiner

LIGHT STRIP

CROSS-REFERENCE TO RELATED APPLICATION(S)

This application is a national stage application, filed under 35 U.S.C. § 371, of International Patent Application No. PCT/CN2020/113730, filed Sep. 7, 2020, and entitled "LIGHT STRIP", the disclosure of which is expressly incorporated herein by reference in its entirety.

FIELD OF THE INVENTION

The invention relates to light fixtures and, more particularly, to light strips with modular design that provides for field-replaceable components.

BACKGROUND

Elongated light strips are used in a variety of different commercial and residential settings. The light strips can be used in a wide variety of manners, including but not limited to being mounted to ceilings and walls and suspended from ceilings and shelves. In many instances these light fixtures house elongated fluorescent light bulbs that span the length. More recently, with the advent of efficient solid state lighting sources, these light fixtures have been used with LEDs. LEDs have certain characteristics that make them desirable for many lighting applications that were previously the realm of incandescent or fluorescent lights. LEDs can emit the same luminous flux as incandescent and fluorescent lights using a fraction of the energy. In addition, LEDs can have a significantly longer operational lifetime. The light strip should be designed to replace one or more of the components in the field where the light strip is in use. This may be necessary because the light strip has been in use for an extended period of time and one or more of the internal components has reached its effective life. For example, one or more of the LEDs may need to be replaced after the light has been in use for more than a predetermined period of time. Additionally or alternatively, the lighting requirement for the light strip may also change over time. For example, a user of a light strip with a first type of LED and/or lens may want a different visual effect. This requires the removal and replacement of one or more of the components to achieve the desired result. Further, the ability of the light strip to be configured in the field facilitates manufacturing. For example, an initial model of the light strip may be provided to the user upon purchase. The initial model includes a first set of components. The user can modify the initial model in the field and prior to the initial use to meet their needs. For example, the initial model may include a first lens. The user may desire a different lens to meet their lighting needs. The user is able to remove the lens on the initial model and replace it with a different lens that is also shipped with the light strip. The light strip should also be aesthetically pleasing and have an appearance to be used in the large variety of settings. The modularity of the design and ability to protect fragile internal components should not adversely affect the aesthetic appearance.

BRIEF SUMMARY

One aspect is directed to a light strip that comprises a housing with an elongated shape having first and second ends, a tray mounted to the housing, and an LED assembly comprising LEDs that emit light outward away from the housing and the tray with the LED assembly comprising an elongated shape with a first end positioned at the first end of the housing and a second end positioned at the second end of the housing. Light engine circuitry is connected to the LED assembly and a lens with an elongated shape extends along the housing and is positioned over the LED assembly. A first end cap is mounted at a first end of the lens and a second end cap mounted at a second end of the lens. The first and second end caps are configured to allow light to pass from the LED assembly and be emitted outward beyond the first and second ends of the housing. In another aspect, the first and second end caps are translucent to allow the light emitted from the LED assembly to be emitted outward beyond the first and second ends of the housing. In another aspect, the first and second end caps are aligned perpendicular to a back wall of the housing.

In another aspect, the housing comprises a back wall and a channel formed between outer walls that extend outward from a perimeter of the back wall, and the lens is attached to the tray at an open side of the housing opposite from the back wall. In another aspect, the housing comprises a back wall, lateral side walls that extend along a length of the housing, and end walls at the first and second ends of the housing, with the first and second end caps aligned along a length of the housing in a non-overlapping arrangement with the end walls of the housing.

In another aspect, opaque outer end caps mounted respectively at the first and second ends of the housing with the outer end caps positioned outward from the first and second end caps.

In another aspect, the outer end caps are larger than the first and second end caps and extend across the housing, the tray, and the lens.

In another aspect, the first and second end caps extend across the lens and are spaced away from a channel formed within the housing.

In another aspect, a latch is positioned in the housing and comprises opposing arms with a first section that contacts against opposing lateral side walls and a second section that is laterally spaced inward from the lateral side walls with the latch further comprising fingers that extend outward and engage the tray to connect the tray to the housing. One aspect is directed to a light strip comprising a housing with a back wall and a pair of lateral side walls that extend outward from the back wall with the housing having a channel that extends between the lateral side walls and having a longitudinal axis. A tray is attached to the housing and positioned in the channel with the tray comprising feet that extend laterally inwardly towards a center of the channel and away from the lateral side walls. An LED assembly is mounted to the tray and comprises LED elements that emit light outward away from the tray. An elongated lens with a central section is configured to extend over the LED assembly and lateral sections on opposing sides of the central section and configured to engage with the tray. The lateral sections comprise an indent that opens outward and is sized to receive the feet of the tray to connect the lens to the housing. End caps are mounted to ends of the housing.

In another aspect, the lens comprises a concave shape with the central section being curved and having an open side that is aligned with the LED assembly when the lateral sections are mounted to the tray.

In another aspect, the tray further comprises first and second wings and a central section with the wings shaped to match and be positioned against the lateral side walls of the housing with the central section extending across the channel of the housing and with the LED assembly mounted to the central section and away from the first and second wings.

In another aspect, the LED assembly comprises a substrate mounted to the central section of the tray and with the LED elements mounted to the substrate.

In another aspect, light-transmissive end caps are mounted to the housing and extend over ends of the lens with the light-transmissive end caps configured to allow light from the LED assembly to be emitted outward beyond ends of the lens.

In another aspect, end caps are configured to mount to the housing and sized to extend over ends of the housing and the lens with the end caps being opaque to prevent the light from the LED assembly to be emitted outward beyond the ends of the lens. One aspect is directed to a light strip comprising a housing with an elongated shape that extends along a longitudinal axis and having a channel. A tray is attached to the housing and positioned in the channel. An LED assembly is mounted to the tray and comprises LED elements that emit light outward away from the tray. An elongated lens with a central section is configured to extend over the LED assembly. Inner end caps are positioned at ends of the lens with the inner ends caps being light-transmissive. Outer end caps are positioned at ends of the housing and along the longitudinal axis of the housing outward from the inner end caps with the outer end caps being opaque.

In another aspect, the inner end caps are smaller than the outer end caps and extend over the ends of the lens and the outer end caps extend over the ends of the lens and the housing.

In another aspect, the housing further comprises end walls that extend across the channel and the inner end caps are aligned along the longitudinal axis with the end walls.

In another aspect, the inner end caps are positioned along the longitudinal axis inward from ends of the housing and the outer end caps abut against the ends of the housing.

In another aspect, the outer end caps are aligned perpendicular to a back wall of the housing.

Of course, those skilled in the art will appreciate that the present embodiments are not limited to the above contexts or examples, and will recognize additional features and advantages upon reading the following detailed description and upon viewing the accompanying drawings.

DETAILED DESCRIPTION

Figure 1:
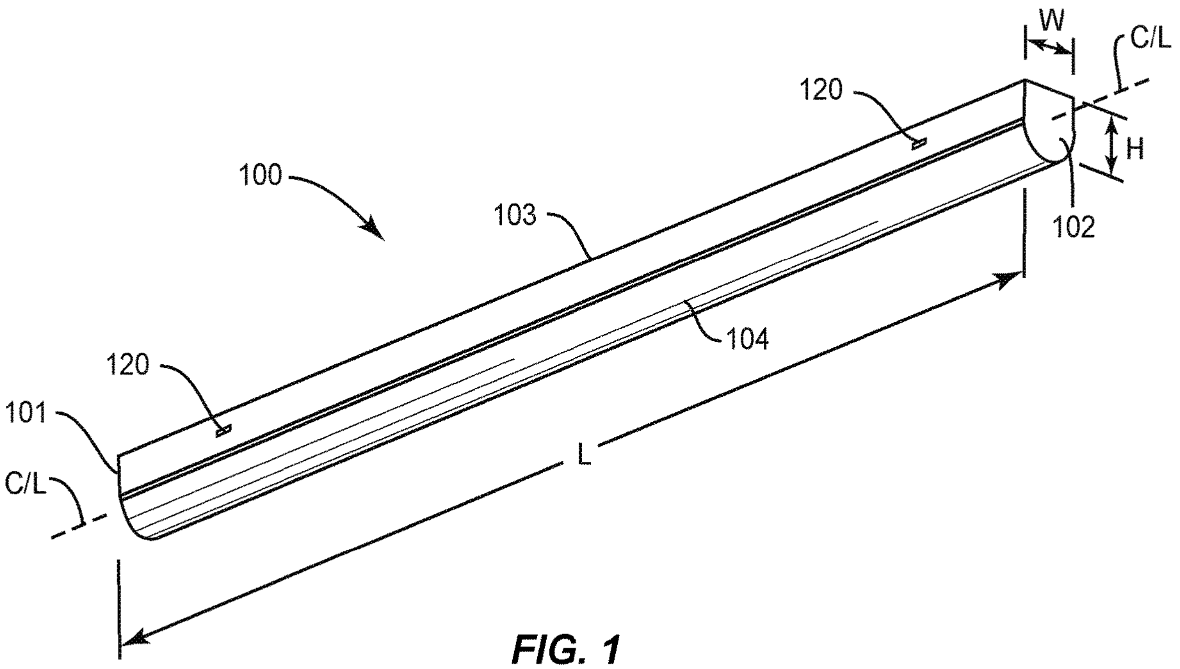
FIG. 1 is a bottom perspective view of a light strip.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Figure 2:
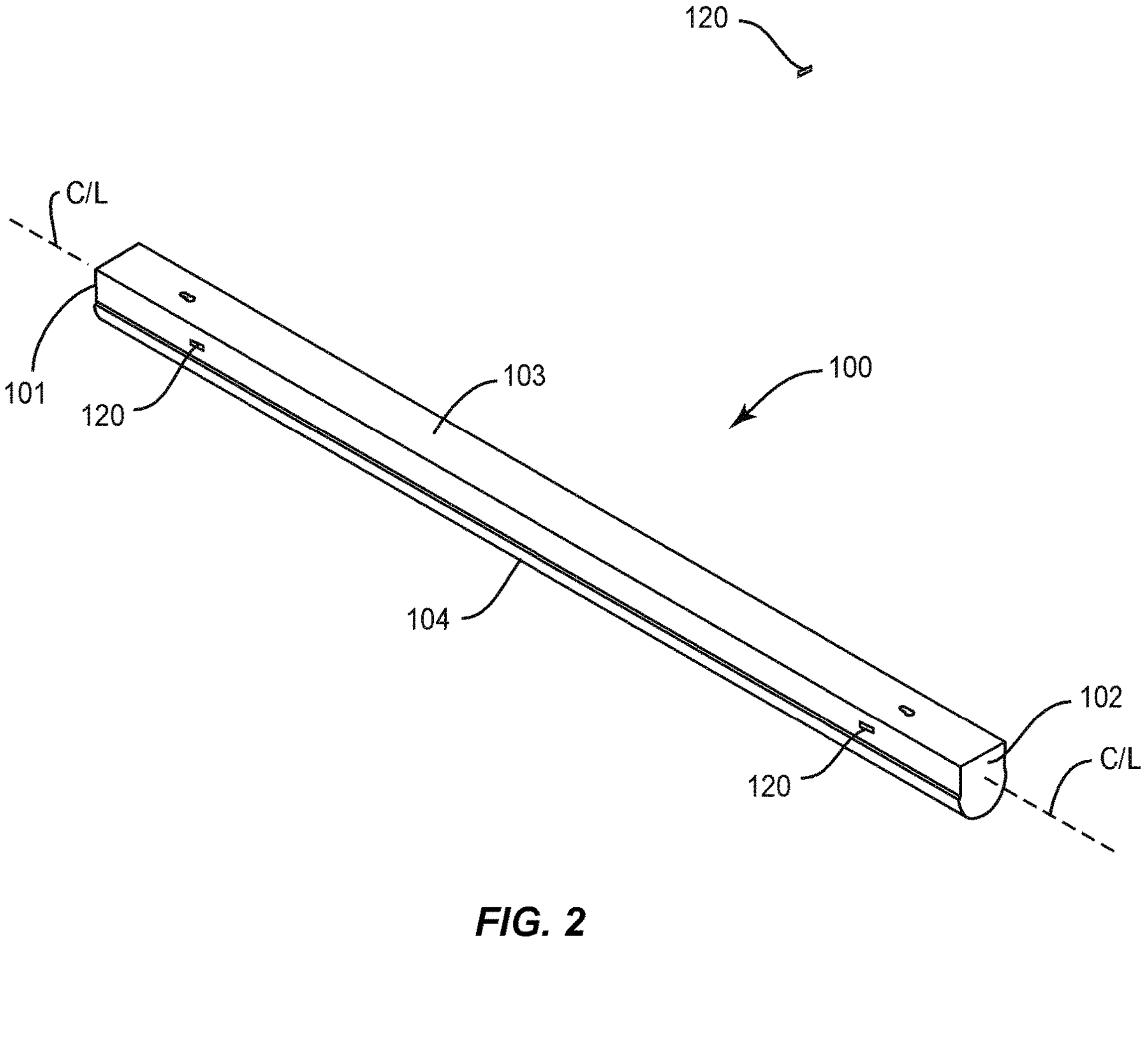
FIG. 2 is a top perspective view of the light strip of FIG. 1.

FIGS. 1 and 2 illustrate a light strip 100 configured to emit light from a second side 104 that faces outward into the lighted area. The light strip 100 includes an elongated length L measured between opposing first and second ends 101, 102. The length L of the light strip 100 can vary. In one example, the length L is four feet. A width W measured perpendicular to the length L is relatively small. The light strip 100 further includes a first side 103 configured to be attached to a support. The first side 103 can be substantially planar to facilitate attachment to a planar support, such as a wall or ceiling. The light strip 100 includes a height H measured between the first side and an opposing second side 104.

The light strip 100 can be used individually to emit light into an area. As disclosed in more detail below, two or more light strips 100 can be connected together in an end-to-end arrangement to provide for illuminating a larger area. In one example, each light strip 100 has a length L of four feet. Multiple light strips 100 can be mounted together to form a light with the desired overall length.

Figure 3:
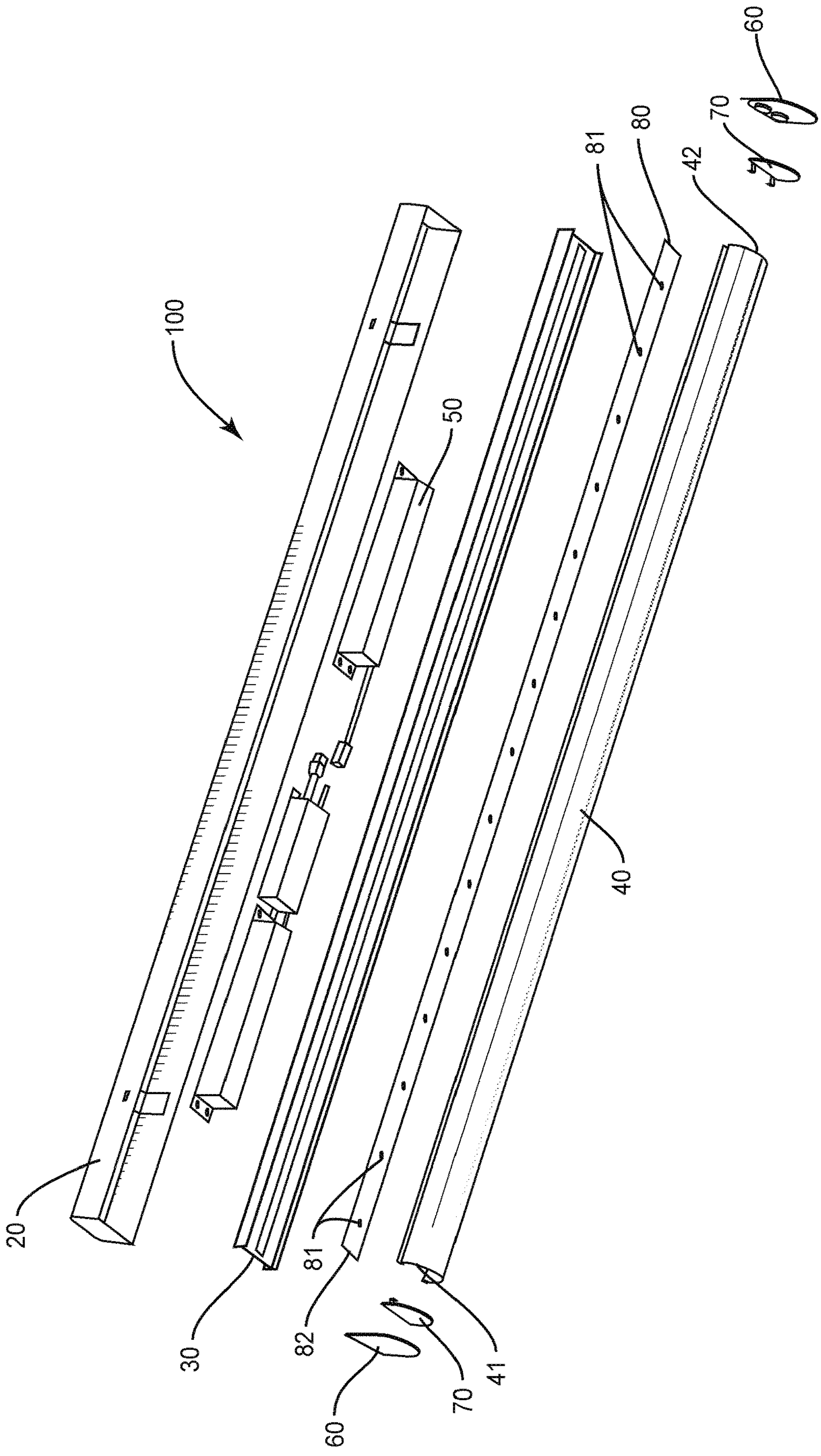
FIG. 3 is an exploded perspective view of a light strip.

As illustrated in the exploded view of FIG. 3, the light strip 100 includes a housing 20, tray 30, lens 40, LED assembly 80, and light engine circuitry 50. The housing 20, tray 30, and lens 40 are configured to be connected together to form the overall external shape of the light strip 100. These components also extend around and form an enclosed interior space that protects the LED assembly 80 and light engine circuitry 50. A first pair of end caps 60*a*, 60*b* forms the first and second ends 101, 102. One or more pairs of end caps are positioned at or in proximity to the outer ends of the housing 20. FIG. 3 illustrates two pairs of end caps 60, 70, although other examples can include a single pair.

The light strip 100 includes a modular design that allows for the lens 40 to be installed and/or replaced in the field after the light strip 100 is mounted to a support. In one example, multiple different lenses 40 can be attached to the light strip 100 depending upon the context of use. The different lenses 40 can include but are not limited to rounded lambertian, rounded asymmetric, rounded wide, square lambertian, square asymmetric, and square wide. In one example, the lenses 40 are configured to provide a snap-fit with the tray 30 and/or housing 20. The snap-fit provides for tactile and audible confirmation that the lens 40 is securely attached. Removal of the lens 40 also provides access to the interior space and the light engine circuitry 50 and/or the LED assembly 80. This access provides for removing and replacing one or both of the various components.

The housing 20 and tray can be constructed from various materials including but not limited to metals such as steel and aluminum, and plastics. The lens 40 can be constructed from materials including but not limited to plastic and ceramics.

Figure 4:
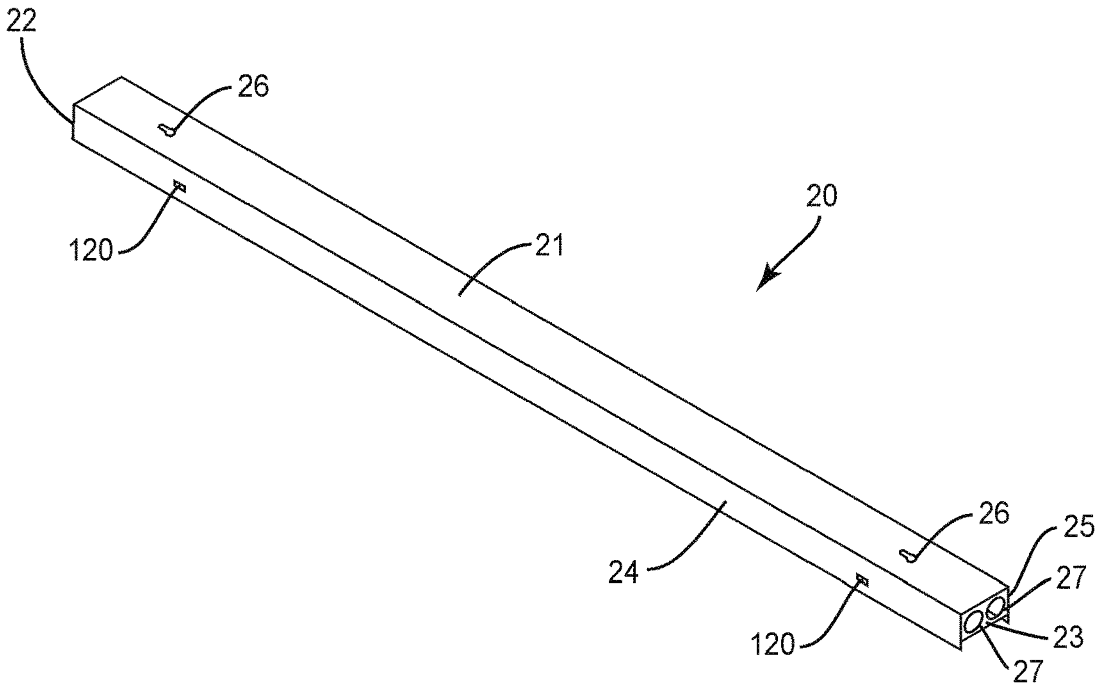
FIG. 4 is a perspective view of a first side of a housing.
Figure 5:
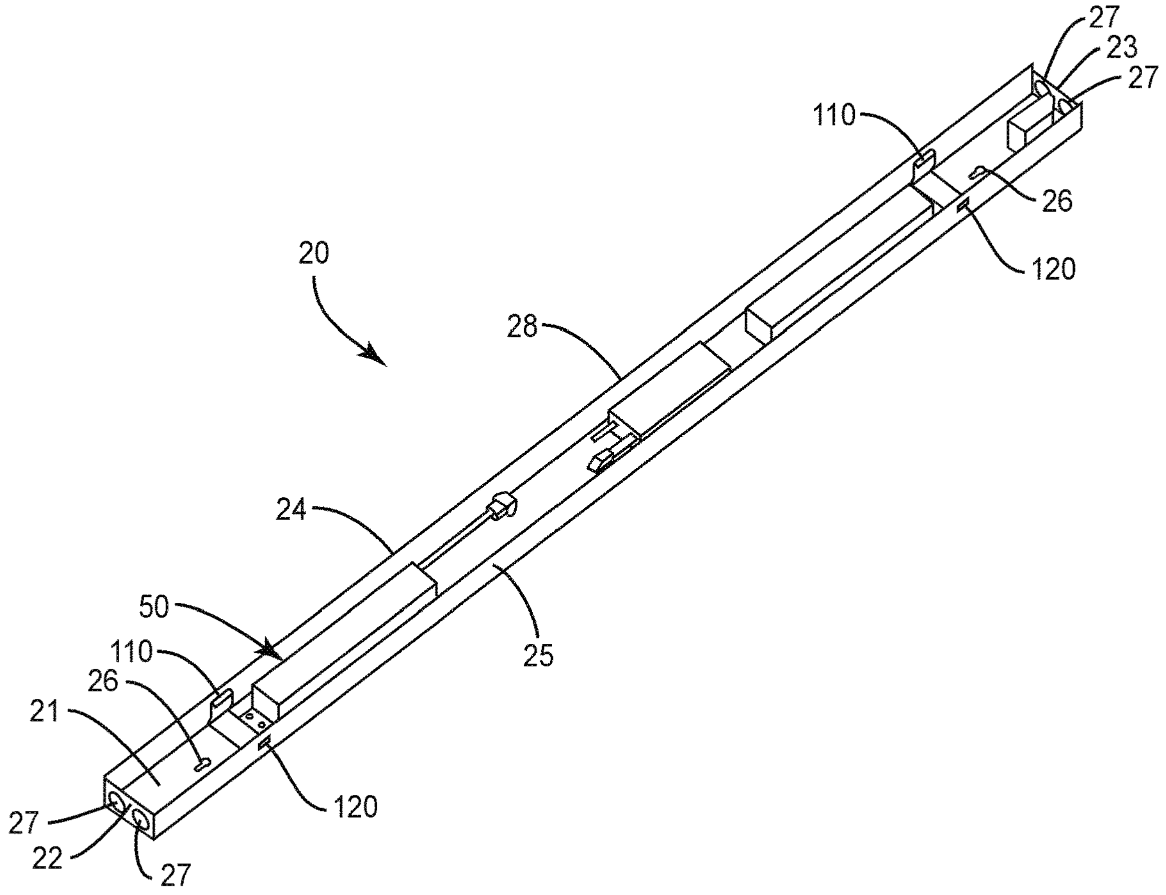
FIG. 5 is a perspective view of a second side of the housing of FIG. 4.

FIGS. 4 and 5 illustrate a housing 20. The housing 20 includes a back wall 21 that forms the first side 103 of the light strip 100 (see FIGS. 1 and 2). In one example, the back wall 21 includes an outer surface that is substantially planar to facilitate attachment to a planar support surface. One or more openings 26 extend through the back wall 21 to receive fasteners to secure the housing 20 to the support.

One or more perimeter walls extend outward from the back wall 21. The perimeter walls can include first and second end walls 22, 23 that extend from the longitudinal ends of the back wall 21. Lateral side walls 24, 25 extend from the lateral sides of the back wall 21. The back wall 21, first and second end walls 22, 23, and lateral side walls 24, 25 form a channel 28 for holding the light engine circuitry 50. The channel 28 extends along a longitudinal axis of the housing 20. The channel 28 also extends along the centerline C/L of the light strip 100 (see FIGS. 1 and 2). In the example of FIGS. 4 and 5, perimeter walls include pairs of end walls 22, 23 and lateral side walls 24, 25. Other examples can include fewer perimeter walls, including but not limited to no end walls, no lateral side walls, or just one end wall and/or side wall or portions of these perimeter walls.

One or more openings 26, 27 extend through the housing 20 and be in communication with the channel 28 to accommodate electrical and/or communication wiring with the light engine circuitry 50. The openings 27 extend through the end walls 22, 23 to connect wires, cables, etc. to adjacent light strips 100. Openings 26 extend through the back wall 21 to connect with external components.

Figure 6:
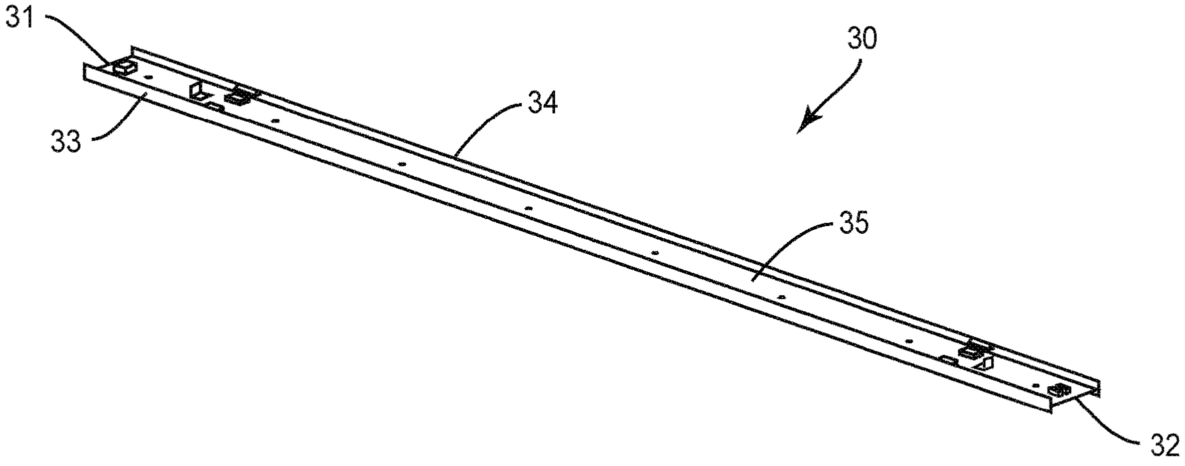
FIG. 6 is a perspective view of a first side of a tray.
Figure 7:
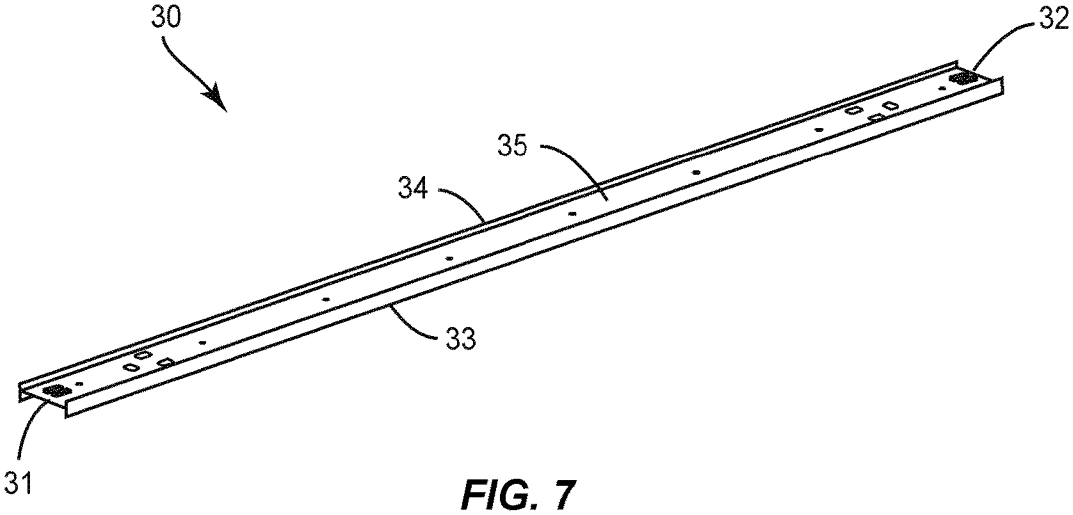
FIG. 7 is a perspective view of a second side of the tray of FIG. 6.
Figure 8:
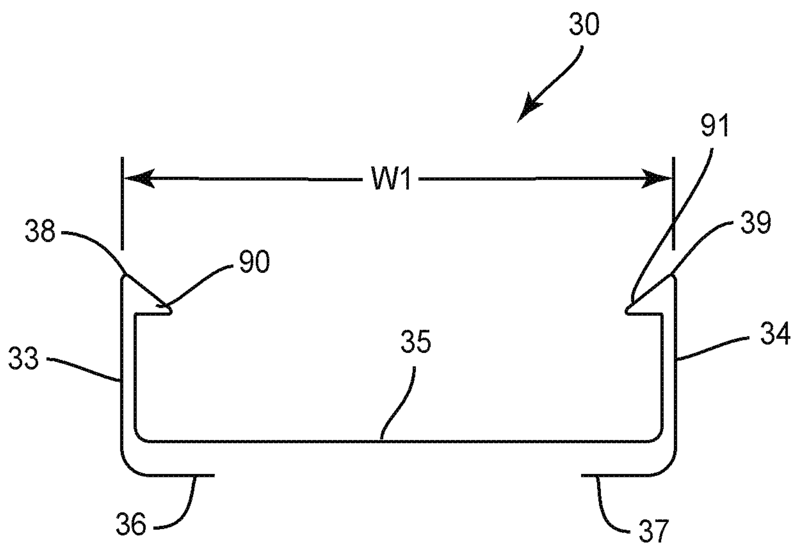
FIG. 8 is a schematic end view of a tray.

The tray 30 is sized to fit within the channel 28 formed in the housing 20. As illustrated in FIGS. 6, 7, and 8, the tray 30 includes an elongated shape with first and second ends 31, 32. The length of the tray 30 measured between the ends 31, 32 is less than or equal to the length L of the housing 20 such that the tray 30 fits within the channel 28. The tray 30 further includes first and second wings 33, 34 that are connected together with a central section 35. A width W1 of the tray 30 is measured between the outer edges of the wings 33, 34.

As best illustrated in the example of FIG. 8, the tray 30 is formed by a single piece of material. The material includes folds 38, 39 that form a two-ply structure of the first and second wings 33, 34. The folds 38, 39 provide for the wings 33, 34 to flex inward during mounting of the tray 30 into the housing 20. This reduces the width W1 and provides for the tray 30 to be positioned within the channel 28. Once positioned, the wings 33, 34 can be released thus providing for the wings 33, 34 to contact against and exert an outward force against the lateral side walls 24, 25 of the housing 20.

The wings 33, 34 include a shape that corresponds to the shape of the lateral side walls 24, 25. When the tray 30 is mounted in the channel 28, the side walls outer edge of the wings 33, 34 are positioned against the lateral side walls 24, 25. In one example, the outer edges of the wings 33, 34 and the lateral side walls 24, 25 are both substantially planar.

The tray 30 further includes feet 36, 37 positioned at the ends of the wings 33, 34. The feet 36, 37 extend inward towards the centerline C/L of the light strip 100. This orientation provides for mounting the lens 40 as will be explained in detail below. Ears 90, 91 extend outward from the wings 33, 34 towards the centerline C/L. In one example as illustrated in FIG. 8, the wings 90, 91 are positioned in proximity to the folds 38, 39. Other examples include the wings 90, 91 positioned at different spacing. In one example, one or both of the ears 90, 91 are formed by the tray 30 (i.e., the material of the tray 30 is formed into the ears 90, 91). In another example, one or both of the ears 90, 91 are separate members that are attached to the tray 30.

In the example of FIG. 8, the wings 33, 34 and central section 35 are formed from a single member. In another example, these are formed from two or more sections that are connected together.

Figure 9:
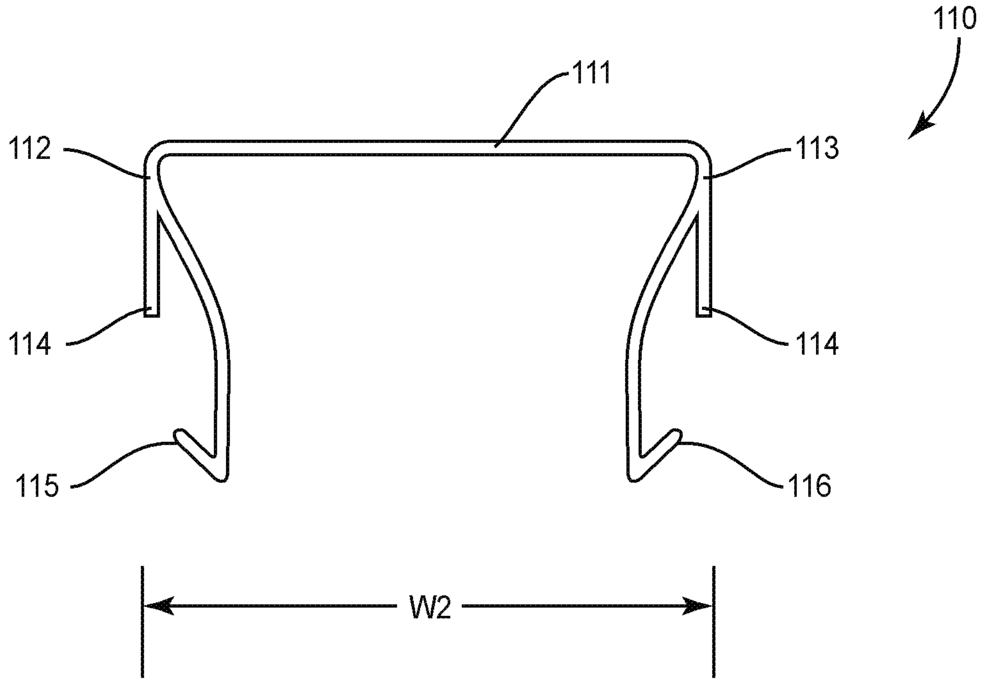
FIG. 9 is a schematic perspective view of a latch.
Figure 10:
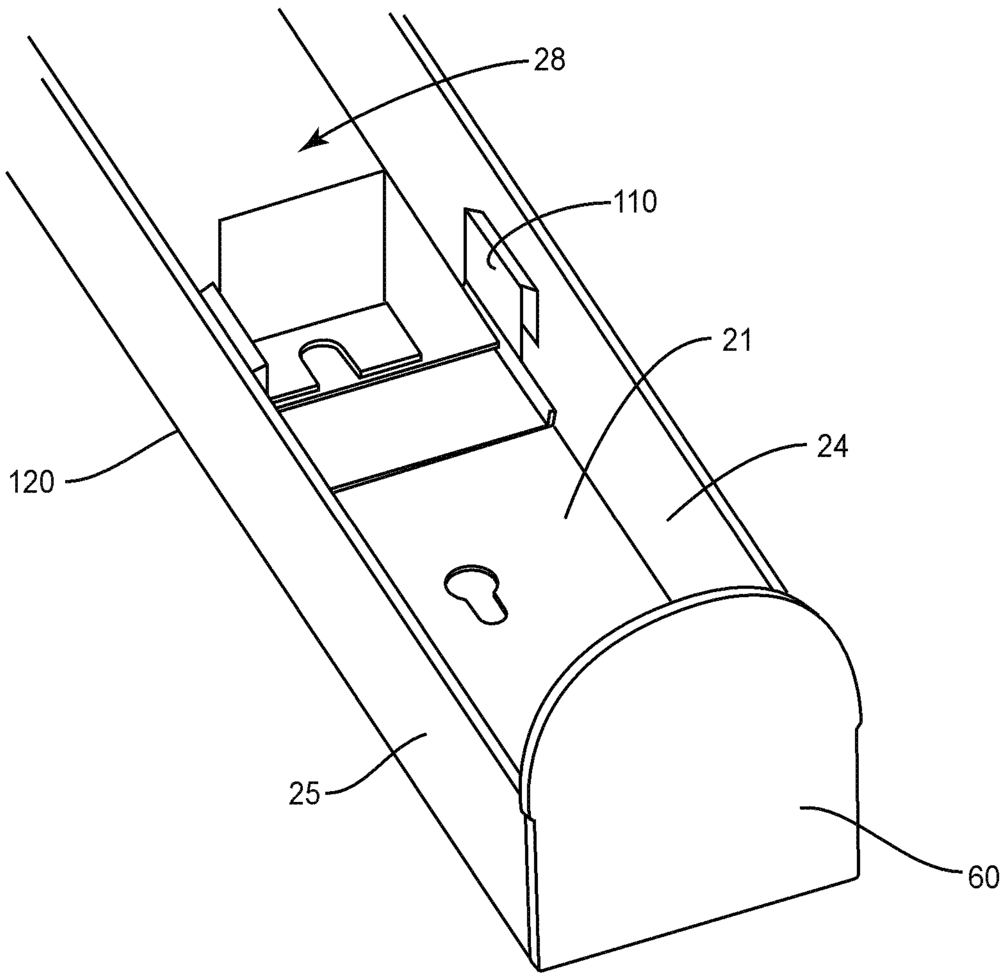
FIG. 10 is a perspective view of a latch mounted to a housing.

One or more latches 110 are positioned in the channel 28 to connect the tray 30 to the housing 20. As illustrated in FIGS. 9 and 10, the latch 101 includes an upper section 111 that is substantially planar to match the shape of the back wall 21 of the housing 20. Arms 112, 113 extend from the upper section 111. In one example, the latch 110 is formed from a single member. Materials include but are not limited to metals and plastics.

One or more portions or the entirety of the arms 112, 113 are shaped to match the lateral side walls 24, 25 of the housing 20. These provide for the arms 112, 113 to be positioned against the lateral side walls 24, 25 when the latch 110 is mounted in the housing 20. The latch 110 includes a width W2 measured between the arms 112, 113. The width W2 is substantially the same as or slightly wider than the width W2 of the housing 20. In one example, the arms 112, 113 are flexible and can be forced inward to reduce the width W2 to mount into the housing 20. Once positioned, the arms 112, 113 are released thus providing an outward force against the lateral side walls 23, 24 to maintain the position of the latch 110 in the housing 20. In one example, extensions 114 can extend outward to provide additional contact with the housing 20.

Fingers 115, 116 are positioned at the ends of the arms 112, 113. The arms 112, 113 are shaped such that the ends are located inward from the lateral side walls 23, 24. The fingers 115, 116 extend from the arms 112, 113 and face outward towards the lateral side walls 23, 24 to engage with and connect the tray 30 to the housing 20. The latch 110 can be held in position against the housing 20 in various manners. In one example, the arms 112, 113 are deformed inwardly during insertion and released to apply and outward force against the lateral side walls 24, 25. In another example, latch 110 is held in position with one or more mechanical fasteners.

Figure 11:
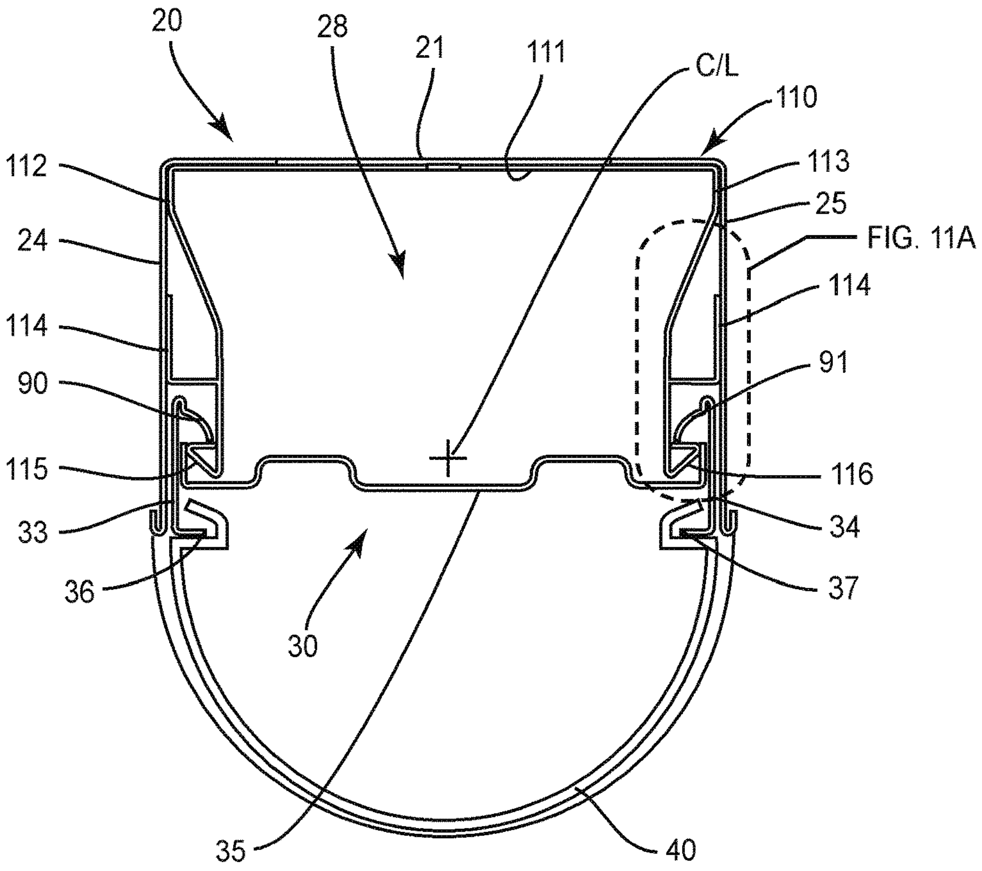
FIG. 11 is a schematic section view of a tray mounted in a housing and attached to a lens that extends over an open side of the housing.
Figure 11A:
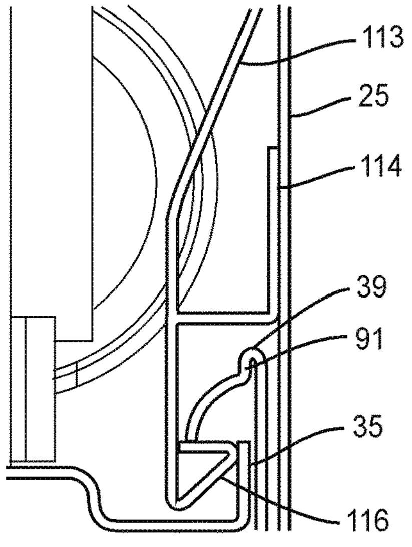
FIG. 11A is a close-up view of a portion of a latch of FIG. 11.

FIGS. 11 and 11A illustrate a latch 110 mounted in the channel 28 of the housing 20. The latch 110 is oriented with the top section 111 positioned at the back wall 21 of the housing 20. In one example, the top section 111 extends along and contacts the back wall 21. In another example, one or more portions of the top section 111 are positioned away from the back wall 21. Upper sections of the arms 112, 113 in proximity to the top section 111 abut against the lateral side walls 24, 25. Extensions 114 extend outward from the arms 112, 113 and abut against the lateral side walls 24, 25. Lower section of the arms 112, 113 away from the top section 111 bend inward into the channel 28 towards the centerline C/L and away from the lateral side walls 24, 25. Fingers 115, 116 positioned at the ends of the arms 102 are spaced away from and face outward towards the lateral side walls 24, 25.

The lower sections of the arms 112, 113 are positioned in the channel 28 inward from the wings 33, 34 of the tray 30. The fingers 115, 116 contact against the ears 90, 91 of the latch 110 that extend outward from the wings 33, 34 towards the center of the channel 28. The surfaces of the ears 90, 91 and fingers 115, 116 engage together and prevent the tray 30 from pulling away and out of the channel 28.

Various numbers of latches 110 can be positioned along the length L of the light strip 100. In one example, latches 110 are spaced apart along the entire length L. In another example, latches 110 are positioned at or in proximity to the end walls 22, 23 of the housing 20.

In one example as illustrated in FIGS. 1 and 10, the housing 20 includes one or more slots 120. The latches 110 are positioned in the housing 20 at the slots 120. The slots 120 provide access to the latches 110 that are within the channel 28 and provide for a person to apply a force to the latches 110 to bend the arms 112, 113 inward and disconnect the tray 30. This provides for the light engine circuitry 50 and/or LED assembly 80 that are attached to the tray 30 to be accessed and replaced in the field. In one example, the slots 120 are aligned in pairs on the lateral side walls 24, 25. Force can be applied to the latches 110 from the opposing sides to open the latch 110 and remove the tray 30.

The LED assembly 80 is positioned in the channel 28. In one example, the LED assembly 80 is mounted to the central section 35 of the tray 30 and faces away from the housing 20. As illustrated in FIG. 3, the LED assembly 80 includes LED elements 81 that are mounted along a substrate 82. The LED elements 81 can be arranged in a variety of different arrangements. In one example as illustrated in FIG. 3, the LED elements 81 are aligned along the substrate 82 in a single row. In another example, the LED elements 81 are aligned in two or more rows. The LED elements 81 can be arranged at various spacings. In one example, the LED elements 81 are equally spaced along the length of the substrate 82. In another example, the LED elements 81 are arranged in clusters at different spacings along the substrate 82.

The LED assembly 80 can include various numbers of types of LED elements 81. In the various examples, the LED assembly 80 can include the same or different LED elements 81. In one example, the multiple LED elements 81 are similarly colored (e.g., all warm white LED elements 81). In such an example all of the LED elements 81 are intended to emit at a similar targeted wavelength; however, in practice there may be some variation in the emitted color of each of the LED elements 81 such that the LED elements 81 may be selected such that light emitted by the LED elements 81 is balanced such that the light strip 100 emits light at the desired color point.

In one example, each LED element 81 is a single white or other color LED chip or other bare component. In another example, each LED element 81 includes multiple LEDs either mounted separately or together. In the various embodiments, the LED elements 81 can include, for example, at least one phosphor-coated LED either alone or in combination with at least one color LED, such as a green LED, a yellow LED, a red LED, etc. In various examples, the LED elements 81 of similar and/or different colors may be selected to achieve a desired color point.

In one example, the LED assembly 80 includes different LED elements 81. Examples include blue-shifted-yellow LED elements ("BSY") and a single red LED elements ("R"). Once properly mixed the resultant output light will have a "warm white" appearance. Another example uses a series of clusters having three BSY LED elements 81 and a single red LED element 81. This scheme will also yield a warm white output when sufficiently mixed. Another example uses a series of clusters having two BSY LED elements 81 and two red LED elements 81. This scheme also yields a warm white output when sufficiently mixed. In other examples, separate blue-shifted-yellow LED elements 81 and a green LED element 81 and/or blue-shifted-red LED element 81 and a green LED element 81 are used. Details of suitable arrangements of the LED elements 81 and electronics for use in the light strip 100 are disclosed in U.S. Pat. No. 9,786,639, which is incorporated by reference herein in its entirety.

The substrate 82 supports and positions the LED elements 81. The substrate 82 can include various configurations, including but not limited to a printed circuit board and a flexible circuit board. The substrate 82 can include various shapes and sizes depending upon the number and arrangement of the LED elements 81.

Each LED element 81 receives power through the light engine circuitry 50. The light engine circuitry 50 is positioned in the channel 28. In one example, the light engine circuitry 50 is positioned between the central section 35 of the tray 30 and the back wall 21 of the housing 20. In one example, the light engine circuitry 50 is mounted to the tray 30 and/or the housing 20. This positioning protects the light engine circuitry 50 from debris such as water and dirt and various external forces that can be applied to the light strip 100. In one example, the light engine circuitry 50 is mounted to a first side of the central section 35 of the tray 30 and the LED assembly 80 is mounted to the opposing second side of the central section 35. In one example, one or more mechanical latches connect the light engine circuitry 50 to be attached in the light strip 100. The one or more latches can be locked/unlocked in the field to attach and detach the light engine circuitry 50 as necessary.

The light engine circuitry 50 includes an LED driver circuit or power supply of suitable type, such as a SEPIC-type power converter and/or other power conversion circuits. At the most basic level the light engine circuitry 50 may comprise an AC to DC converter, a DC to DC converter, or both. In one example, the light engine circuitry 50 comprises an AC to DC converter and a DC to DC converter. In another example, the AC to DC conversion is done remotely (i.e., outside the light strip 100), and the DC to DC conversion is done at the light engine circuitry 50 locally at the light strip 100. In yet another example, only AC to DC conversion is done at the light engine circuitry 50 at the light strip 100. Some of the electronic circuitry for powering the LED elements 81 such as the driver and power supply and other control circuitry may be contained as part of the LED assembly 80 or the electronics may be supported separately from the LED assembly 80. In one example, a single driver circuit is operatively connected to the LED elements 81. In another example, two or more driver circuits are connected to the LED elements 81.

Figure 12:
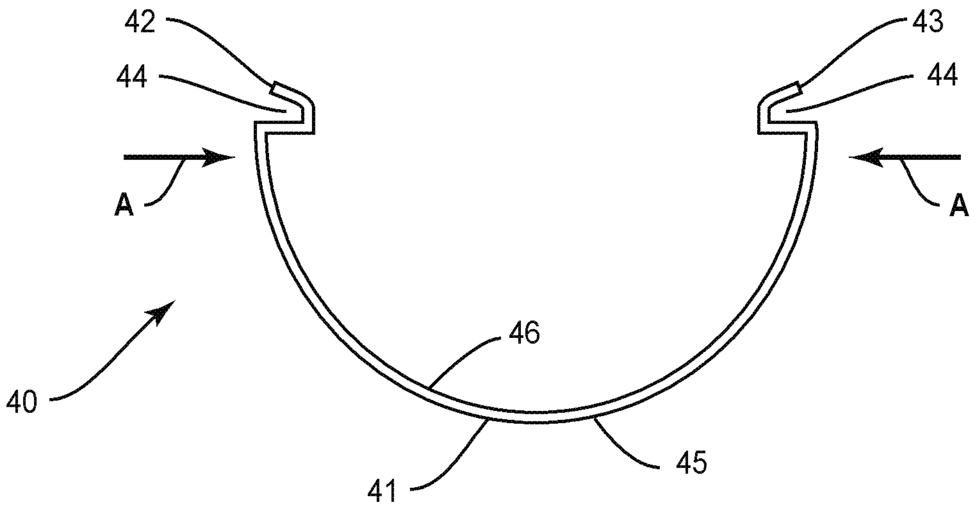
FIG. 12 is an end view of a lens.

The lens 40 extends over the LED assembly 80. As illustrated in FIGS. 3 and 12, the lens 40 includes an elongated shape with opposing first and second ends 41, 42. The lens 40 includes a length that extends the length of the housing 20. The lens 40 is sized to substantially extend the length of the housing. In one example, the lens 40 is shorter than the housing 20 to accommodate one or more end caps.

The lens 40 includes a central section 41 and opposing ends 42, 43. In one example as illustrated in FIG. 12, the central section 41 includes a concave curved shape that extends the entirety of the central section 41 towards the ends 42, 43. The extent of curvature can vary depending upon the desired light output. The central section 41 of the lens 40 can have various shapes and configurations depending upon the type of lens to direct the desired light output. The different lens types can include but are not limited to rounded lambertian, rounded asymmetric, rounded wide, square lambertian, square asymmetric, and square wide. The lens 40 includes the same shape along the length. Further, each of the first and second ends 41, 42 are open (i.e., no end wall).

Indents 44 are formed in the lens 40 in proximity to each of the ends 42, 43. The indents 44 face outward when the lens 40 is mounted in the channel 40. The indents 40 are sized receive to receive the feet 36, 37 of the tray 30. The ends 42, 43 extend over the indents 44 and act to maintain the attachment.

The lens 40 can be a single piece, or can be constructed from two or more pieces. The lens 40 can be constructed from various materials, including but not limited to plastic, such as acrylic, and glass. In one specific example, the lens 40 is extruded diffuse acrylic. In one example, the entire lens 40 is light transmissive and diffusive. In one example, one or more sections of the lens 40 are clear. The outer surface 45 may be uniform or may have different features and diffusion levels. In another example, one or more sections of the lens 40 are more diffuse than the remainder of the lens 40. The lens 40 has a thickness measured between the outer and inner surfaces 45, 46. The thickness can be constant throughout the length of the lens 40, or can vary over one or more sections.

Figure 13:
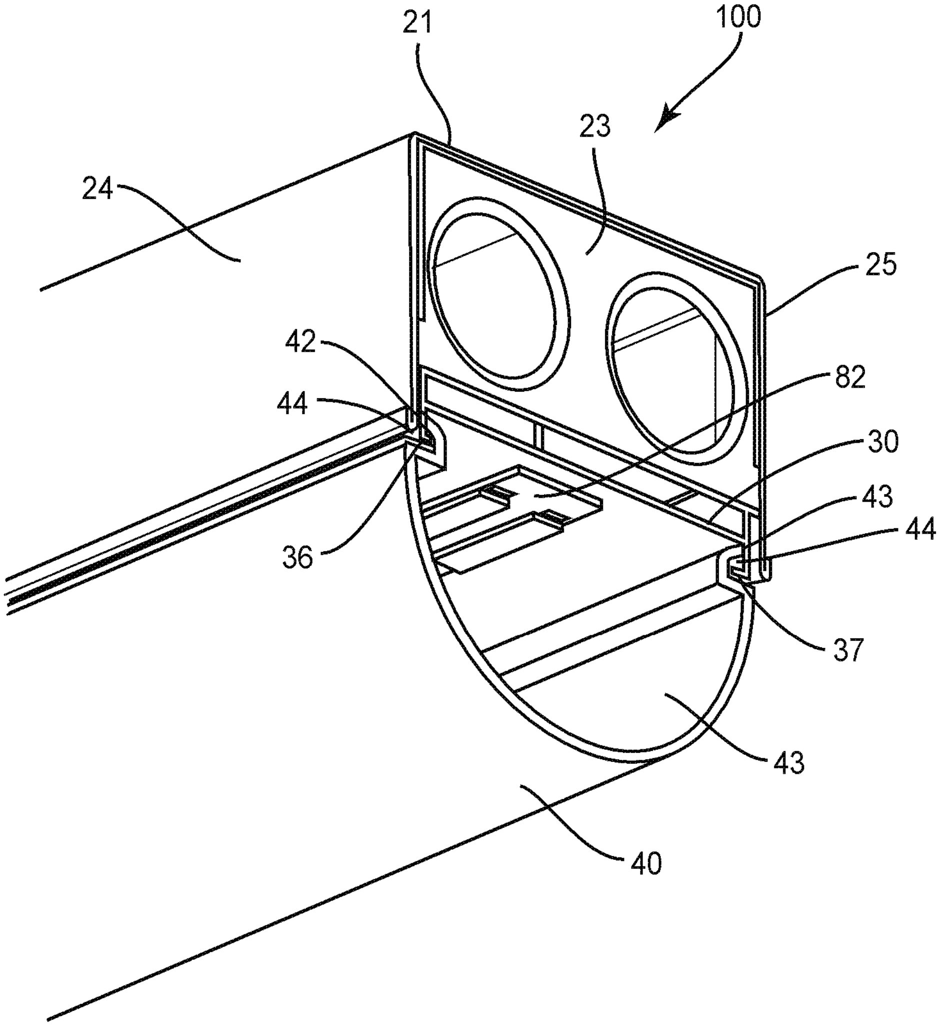
FIG. 13 is a partial perspective view of an exposed end of the housing, tray, and lens.

As illustrated in FIGS. 11 and 13, the lens 40 attaches to the tray 30. Specifically, the indents 44 are aligned with and receive the feet 36, 37 on the tray 30. The ends 42, 43 extend over the feet 36, 37 respectively and limit the extent that the lens 40 is inserted into the channel 28. The shapes of the indents 44 and feet 36, 37 maintain the lens 40 attached to the tray 30 regardless of the orientation of the light strip 100. Further, the ends 42, 43 are positioned within the channel 28. This positioning prevents moisture and/or debris from moving along the housing 20 and/or lens 40 and into the channel 28.

The lens 40 is designed to be removed without removing other components of the light strip 100. In one example, the lens 40 is flexible. As illustrated in FIG. 12, when a compressive force A is applied to one or both sides in proximity to the indents 44, the lens 40 compresses inward. This reduces the distance between the indents 44 and provides for removing and/or attaching the lens 40 to the tray 30. Once the compressive force A is removed, the lens 40 rebounds to the original shape thus securing the indents 44 onto the feet 36, 37 of the tray 30.

Figure 14:
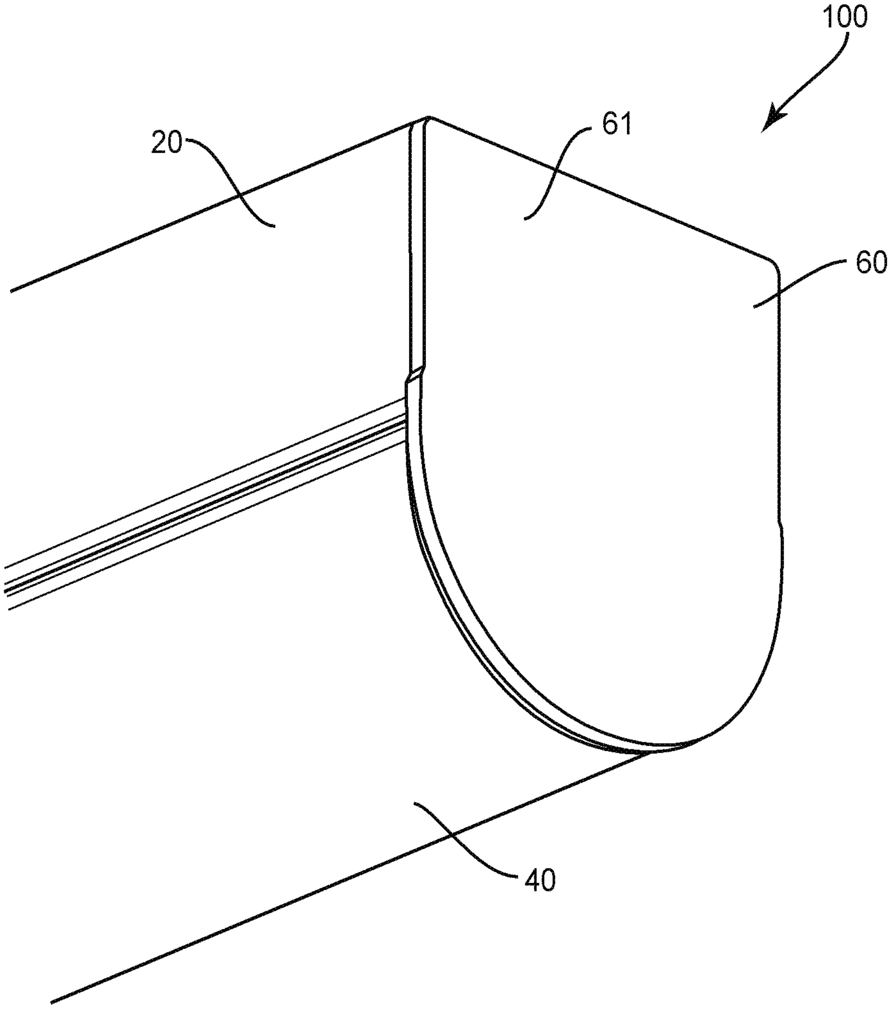
FIG. 14 is a partial perspective view of an end cap mounted to an end of the housing, lens, and tray.

As illustrated in FIGS. 1, 2, 3, and 14, end caps 60 are mounted at the outer ends of the 101, 102 of the light strip 100. The end caps 60 include a shape that matches the outline of the housing 20 and lens 40. As best illustrated in FIG. 14, the end caps 60 abut against the outer ends of the housing 20. The end caps 60 can be attached in various manners. In one example, the end caps 60 are sized to provide a friction fit with the housing 20 and/or lens 40. In another example, tabs extend outward from the inner side of the end caps 60 and engage with the housing 20 and/or lens 40. The outer side 61 of the end caps 60 is substantially flat providing an aesthetically pleasing appearance. The end caps 60 can be constructed from various materials, including but not limited to plastic and metal such as aluminum. In one example, the end caps 60 are opaque and prevent light from being emitted outward beyond the end caps 60. In another example, the end caps 60 are light transmissive.

Figure 15:
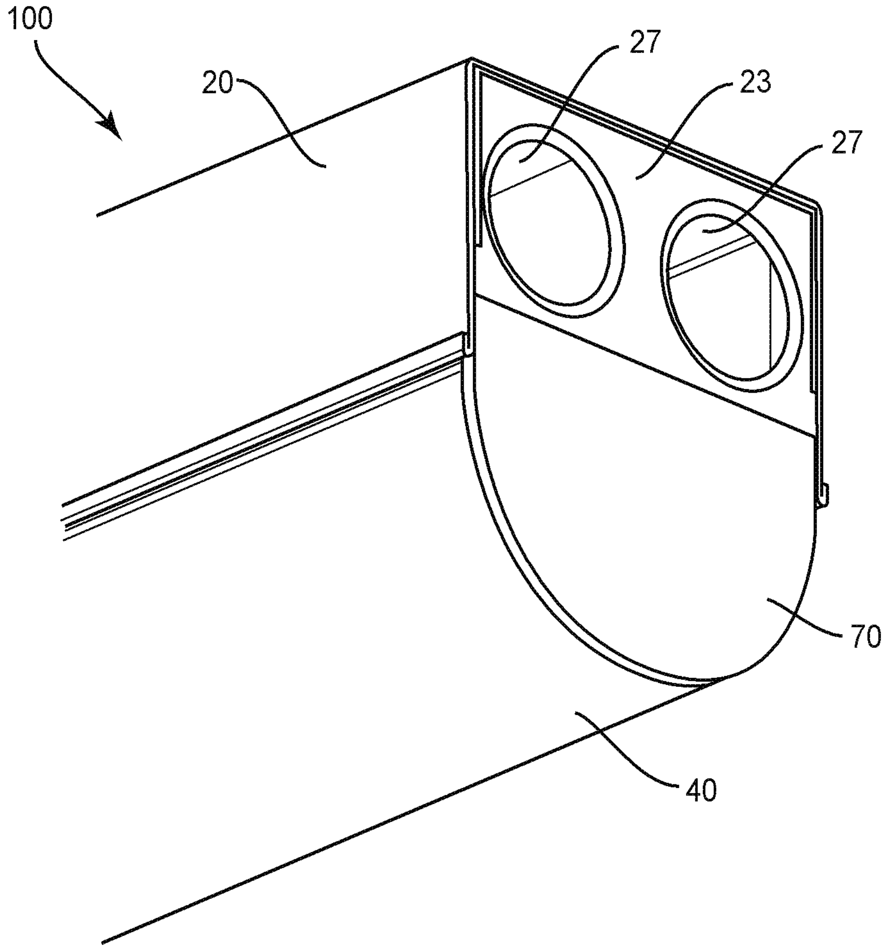
FIG. 15 is a partial perspective view of an end cap mounted to an end of the lens and tray.
Figure 20:
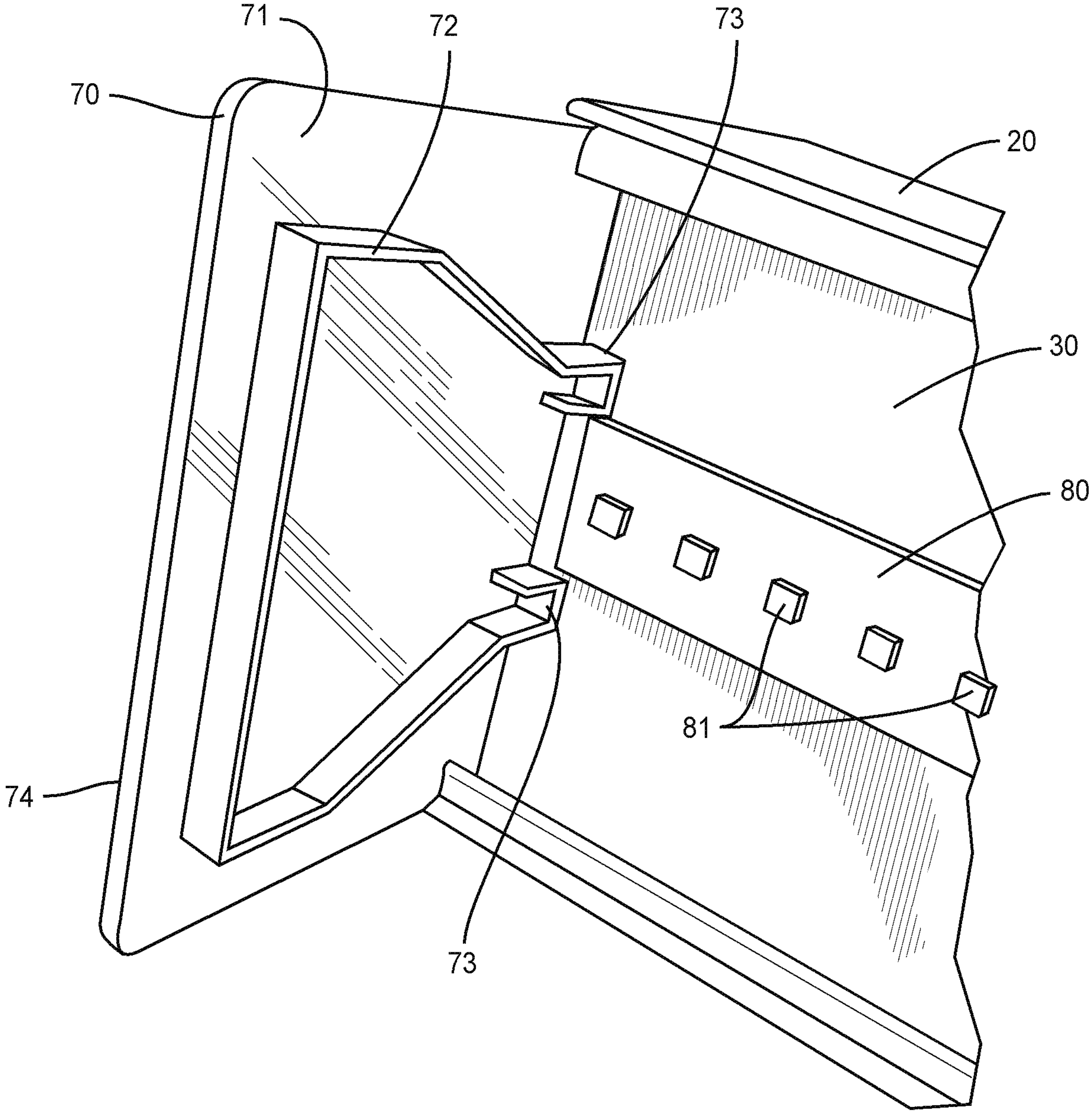
FIG. 20 is a perspective view of an end cap attached to a housing.

End caps 70 are positioned within the outer end caps 60. That is, the inner end caps 70 are covered by the outer end caps 60 when mounted to the light strip 100. As illustrated in FIGS. 3 and 15, the inner end caps 70 are positioned adjacent to the end walls 23 of the housing 20 including the end caps 70 aligned with and abutting against the end walls 23. In one example, the end caps 70 extend across the open ends of the lens 40. The shape of the end caps 70 can match the shape of the lens 40 to provide a uniform appearance. For example, FIG. 15 includes the end cap 70 with a curved shape that matches the curved shape of the lens 40. FIG. 20 includes a substantially rectangular shape with rounded corners to match the shape of a corresponding lens (not illustrated in FIG. 20).

The end caps 70 are positioned away from the openings 27 in the end walls 23 such that wiring can pass outward beyond the light strip 100. As illustrated in FIG. 15, the end cap 70 can abut against the end wall 23 to prevent a gap through which light from the LED assembly 80 can pass directly into the environment.

The end caps 70 abut against the ends of the lens 40 to prevent light from being emitted through the juncture. In one example, an inner surface 71 of the end cap 70 is substantially flat and abuts against an end of the lens 40 to provide abutting contact and to prevent gaps. As illustrated in FIG. 20, an extension 72 can extend outward from the inner surface 71 of the end cap 70. When the end cap 70 is mounted to the housing 20, feet 73 abut against the top of the tray 30. The extension 72 prevents light leakage by preventing light emitted from the LED assembly 80 from being emitted directly outward into the environment. In the event there is a gap between the end cap 70 and the lens 40, the extension 72 provides for blocking the light that could potentially otherwise be emitted through the gap.

The end caps 70 can attach to the housing 20, tray 30, and/or lens 40 in various manners including but not limited to one or more of a friction fit, mechanical fastener, and tabs that extend outward from the inner side. As illustrated in FIG. 15, the end caps 70 are recessed inward from the ends of the housing 20. When adjacent light strips 100 are connected together, the ends of the housings 20 contact and the end caps 70 are recessed inward. In another example, the outer surface 74 of the end caps 70 abut together when adjacent light strips 100 are mounted together.

The end caps 70 can be constructed from a variety of different materials, including but not limited to plastic and glass. In one example, the end caps 70 are light transmissive such that light from the LED assembly 80 is emitted outward from the ends of the lens 40 and/or the housing 20. This provides for a more uniform light distribution when multiple light strips 100 are aligned in an end-to-end configuration. In one example, the end caps 70 are transparent. In another example, the end caps 70 are translucent. In one example, the end caps 70 are a lens and concentrate and/or disperse light emitted from the LED assembly 80. In one example as illustrated in FIG. 15, the end cap 70 is constructed from a light-transmissive material and the end wall 23 is opaque.

In one example, the end caps 70 and lens 40 are constructed from the same material. This provides for a more uniform appearance to the light strip 100. In one example, the end caps 70 and the lens 40 include the same thickness to provide for a uniform appearance.

The inner end caps 70 are smaller than the outer end caps 60. The inner end caps 70 extend over the ends of the lens 40. The outer end caps 60 extend over the ends of the lens 40 and the housing 20. In one example, the end caps 60, 70 are perpendicular to the back wall 21 of the housing 20.

In one example, the end caps 70 are positioned and configured to remain attached to the housing 20 when the lens 40 is removed. As illustrated in FIG. 20, the end cap 70 is positioned at an end of the housing 20 with the lens 40 having a length L that is shorter than the housing 20 to provide for positioning within the end caps 70. The end caps 70 and LED assembly 80 are also positioned and configured to not interference with the removal and attachment of the lens 40 to the housing 20. The end caps 70 are positioned at the ends of the lens 40 and provide for compressing the lens 40 laterally inward during attachment and removal. Likewise, the LED assembly 80 is spaced laterally inward from the outer edge of the housing 20 to provide for this lateral movement of the lens 40.

Figure 16:
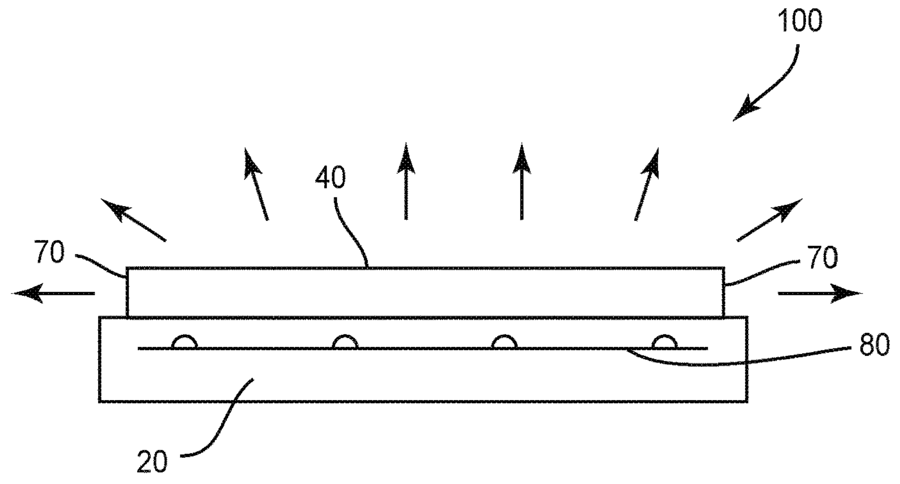
FIG. 16 is a schematic diagram of a light strip.

The number and types of end caps on the light strip 100 can vary. Depending upon the desired use, the end caps can be removed or remain attach to direct the light as needed. In one example as illustrated in FIG. 16, the light strip 100 includes just the inner end caps 70 that allow the light from the LED assembly 80 to pass outward beyond the ends of the lens 40.

Figure 17:
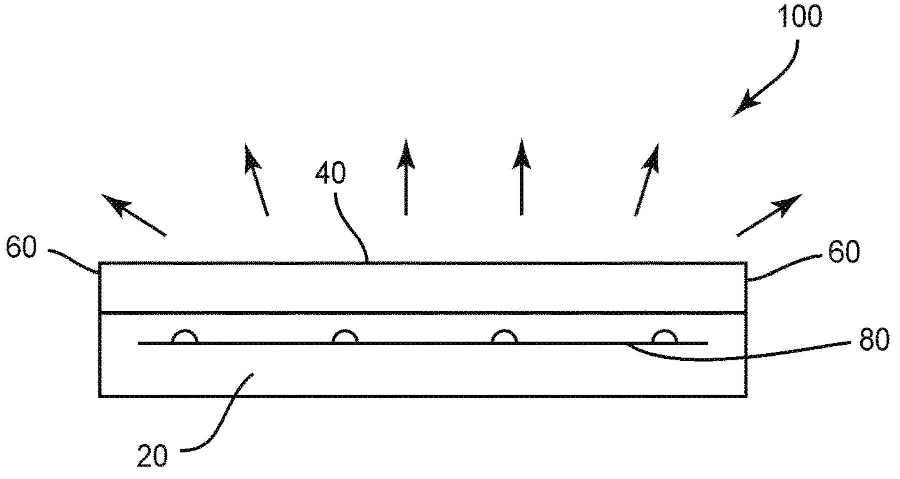
FIG. 17 is a schematic diagram of a light strip.

In another example as illustrated in FIG. 17, the light strip 100 includes just the outer end caps 60 that block the light from being emitted outward beyond the ends of the lens 40.

Figure 18:
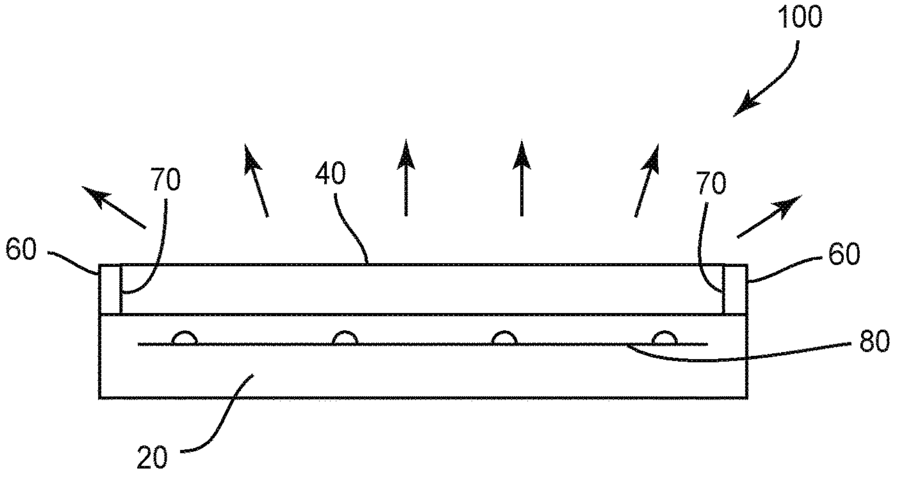
FIG. 18 is a schematic diagram of a light strip.

FIG. 18 includes an example with both end caps 60, 70. When the light strip 100 is used independently (i.e., without other light strips 100), the outer end caps 60 remain attached to block the light from being emitted outward beyond the ends of the lens 40. The inner end caps 70 can remain attached or can be removed for this type of use.

Figure 19:
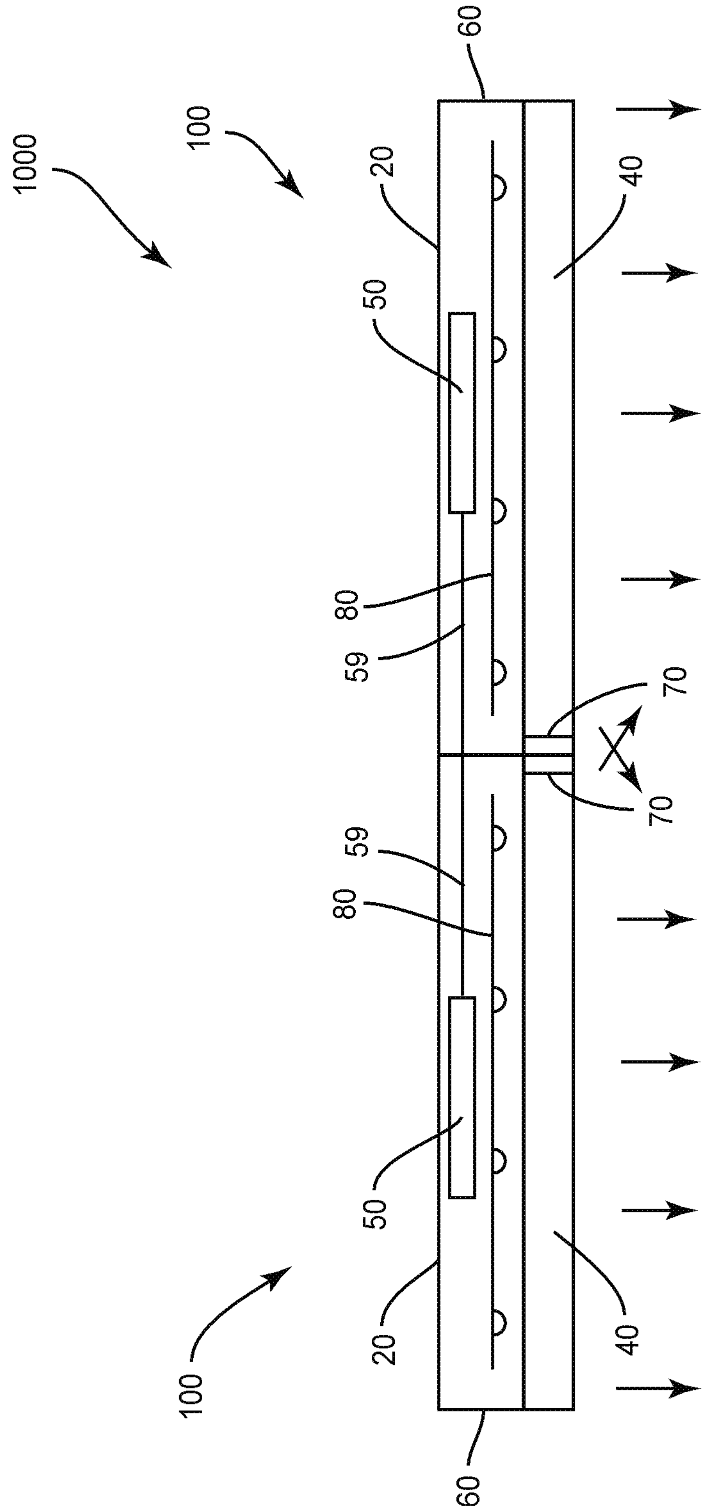
FIG. 19 is a schematic diagram of a light fixture that comprises two light strips that are interconnected together.

The light strip 100 is configured to be positioned with one or more light strips 100 to create an overall elongated light fixture 1000. FIG. 19 illustrates a light fixture 1000 formed by two light strips 100. The light strips 100 are mounted in an end-to-end arrangement providing an appearance that the light fixture 1000 is a single unit. The outer end caps 60 are removed on these ends of both light strips 100. This allows for the housings 20 and lenses 40 to abut together to give the unitary appearance. In one example, there are no gaps between these components. In one example, one of the light strips 100 is inserted into the end of the other light strip to form an overlapping arrangement. The extent of overlap may vary, with one example being a very minor overlap just to provide the appearance of a single unitary light fixture 1000.

Inner end caps 70 are attached to the ends of the lenses 40 (see FIG. 15). The inner end caps 70 allow light to pass from the LED assemblies 80 outward beyond the ends of the lenses 40. This provides for a more uniform light distribution along the length of the light fixture 1000. The distribution of light through the end caps 70 prevents or reduces shadowing that could occur at the junction between the light strips 100. The light engine circuitry 50 for the light strips 100 can be interconnected through wires 59 that extend through openings 27 in the housing end walls 22, 23 (see FIG. 15).

End caps 60 are attached to the outer ends of the light fixture 1000. The end caps 60 provide a uniform appearance. The end caps 60 also blocks light from being emitted outward beyond the outer ends of the light fixture 1000.

FIG. 19 includes an example with two light strips 100 interconnected to form the single light fixture 1000. Other examples can include more than two light strips 100 depending upon the desired size of the light fixture 1000. The ability to connected together two or more separate light strips 100 into a single light fixture 1000 provides for a user to assemble the desired configurations. Further, this prevents manufacturing of a single, integral light strip with the elongated shape that could pose manufacturing and/or shipping difficulties.

The light strips 100, either alone or in combination, can be used in a variety of different contexts for both interior and exterior lighting. The light strips 100 are further configured for residential, commercial, industrial, and various other applications. The light strips 100 are designed for removing and/or replacing one or more components in the field.

In one method, the user applies a compressive force to one or both lateral sides of the lens 40. This force deforms one or both lateral sides of the lens 40 and allows for one or both indents 44 to move away from the feet 36, 37 of the tray 30. With the indents disconnected, the lens 40 can be removed from the tray 30 and housing 20.

With the lens 40 removed, the user can access the LED assembly 80 and/or light engine circuitry 50 as necessary. In one example, the LED assembly 80 is attached to the outer face of the central section 35 of the tray 30. The LED assembly 80 can be detached from the central section 35 and replaced while the LED assembly 80 remains attached in the housing 20. In another example, the tray 30 is removed from the housing 20 prior to detaching the LED assembly 80. Removal of the tray 30 can include the user inserting a tool, such as the end of a screwdriver, into slots 120 that extend along the housing 20. At each slot, the end of the screwdriver contacts against an arm 112, 113 of a latch. The user applies a force that bends the arm 112, 113 inward and moves a finger 115, 116 away from ears 90, 91 on the tray 30. With the fingers 115, 116 and ears 90, 91 detached, the tray 30 can be removed from the housing 20.

Once the tray 30 is removed, the user can access the LED assembly 80 and light engine circuitry 50 that are mounted on the tray 30. The components can be replaced or serviced as necessary. In one example, the light engine circuitry 50 is mounted in the channel 28 in the housing 20 and can be accessed.

Once the one or more components are services and/or replaced, the process is reversed to reconstruct the light strip 100. The tray 30 with the attached light engine circuitry 50 and LED assembly 80 is snapped back into the housing 20. The insertion of the tray 30 causes the ears 90, 91 of the tray 30 to applying a force to the arms 112, 113 of the latch 110. This force deforms the arms 112, 113 inward. Once the ears 90, 91 have passed the fingers 115, 116, the arms 112, 113 rebound outward and the fingers 115, 116 re-engage with the ears 90, 91 to maintain the tray 30 connected in the housing 20. The lens 40 is aligned with the tray 30 and the lens 40 is bent inward and the indents 44 are aligned with the feet 36, 37 on the tray 30. Once aligned, the force on the lens 40 is removed and the lens 40 rebounds outward to engage the indents 44 on the feet 36, 37.

In the various examples, the light strips 100 can include one or more communication components forming a part of the light engine circuitry 50, such as an RF antenna that senses RF energy. The communication components may be included, for example, to allow the light strip 100 to communicate with other light strips 100 and/or with an external wireless controller. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such a sensor may be integrated into the light control circuitry. In various examples described herein various smart technologies may be incorporated in the lamps as described in the following United States patent applications "Solid State Lighting Switches and Fixtures Providing Selectively Linked Dimming and Color Control and Methods of Operating," application Ser. No. 13/295,609, filed Nov. 14, 2011, now U.S. Pat. No. 8,736,186, which is incorporated by reference herein in its entirety; "Master/Slave Arrangement for Lighting Fixture Modules," application Ser. No. 13/782,096, filed Mar. 1, 2013, now U.S. Pat. No. 9,572,226, which is incorporated by reference herein in its entirety; "Lighting Fixture for Automated Grouping," application Ser. No. 13/782,022, filed Mar. 1, 2013, now U.S. Pat. No. 9,155,165, which is incorporated by reference herein in its entirety; "Lighting Fixture for Distributed Control," application Ser. No. 13/782,040, now U.S. Pat. No. 8,975,827, filed Mar. 1, 2013, which is incorporated by reference herein in its entirety; "Efficient Routing Tables for Lighting Networks," application Ser. No. 13/782,053, filed Mar. 1, 2013, now U.S. Pat. No. 9,155,166, which is incorporated by reference herein in its entirety; "Handheld Device for Communicating with Lighting Fixtures," application Ser. No. 13/782,068, filed Mar. 1, 2013, now U.S. Pat. No. 9,433,061, which is incorporated by reference herein in its entirety; "Auto Commissioning Lighting Fixture," application Ser. No. 13/782,078, filed Mar. 1, 2013, now U.S. Pat. No. 8,829,821, which is incorporated by reference herein in its entirety; "Commissioning for a Lighting Network," application Ser. No. 13/782,131, filed Mar. 1, 2013, now U.S. Pat. No. 8,912,735, which is incorporated by reference herein in its entirety; "Ambient Light Monitoring in a Lighting Fixture," application Ser. No. 13/838,398, filed Mar. 15, 2013, now U.S. Pat. No. 10,161,612, which is incorporated by reference herein in its entirety; "System, Devices and Methods for Controlling One or More Lights," application Ser. No. 14/052,336, filed Oct. 11, 2013, now U.S. Pat. No. 9,622,321, which is incorporated by reference herein in its entirety; and "Enhanced Network Lighting," Application No. 61/932,058, filed Jan. 27, 2014, which is incorporated by reference herein in its entirety. Additionally, the light strips 100 described herein can include the smart lighting control technologies disclosed in U.S. Provisional Application Ser. No. 62/292,528, titled "Distributed Lighting Network", filed on Feb. 8, 2016, the entirety of this application being incorporated by reference herein.

The present invention may be carried out in other ways than those specifically set forth herein without departing from essential characteristics of the invention. The present examples are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A light strip comprising:
- a housing with an elongated shape having first and second ends;
- a tray mounted to the housing;
- an LED assembly comprising LEDs that emit light outward away from the housing and the tray, the LED assembly comprising an elongated shape with a first end positioned at the first end of the housing and a second end positioned at the second end of the housing;
- light engine circuitry connected to the LED assembly;
- a lens with an elongated shape that extends along the housing and is positioned over the LED assembly;
- a first end cap mounted at a first end of the lens and a second end cap mounted at a second end of the lens, the first and second end caps configured to allow light to pass from the LED assembly and be emitted outward beyond the first and second ends of the housing; and
- opaque outer end caps mounted respectively at the first and second ends of the housing, the outer end caps positioned outward from the first and second end caps.

2. The light strip of claim 1, wherein the first and second end caps are translucent to allow the light emitted from the LED assembly to be emitted outward beyond the first and second ends of the housing.

3. The light strip of claim 1, wherein the first and second end caps are aligned perpendicular to a back wall of the housing.

4. The light strip of claim 1, wherein the housing comprises a back wall and a channel formed between outer walls that extend outward from a perimeter of the back wall, and the lens is attached to the tray at an open side of the housing opposite from the back wall.

5. The light strip of claim 1, wherein the housing comprises a back wall, lateral side walls that extend along a length of the housing, and end walls at the first and second ends of the housing, the first and second end caps are aligned along a length of the housing in a non-overlapping arrangement with the end walls of the housing.

6. The light strip of claim 1, wherein the outer end caps are larger than the first and second end caps and extend across the housing, the tray, and the lens.

7. The light strip of claim 1, wherein the first and second end caps extend across the lens and are spaced away from a channel formed within the housing.

8. The light strip of claim 1, further comprising a latch positioned in the housing and comprising opposing arms with a first section that contacts against opposing lateral side walls and a second section that is laterally spaced inward from the lateral side walls, the latch further comprising fingers that extend outward and engage the tray to connect the tray to the housing.

9. A light strip comprising:
- a housing comprising a back wall and a pair of lateral side walls that extend outward from the back wall, the housing having a channel that extends between the lateral side walls and having a longitudinal axis;
- a tray attached to the housing and positioned in the channel, the tray comprising feet that extend laterally inwardly towards a center of the channel and away from the lateral side walls;
- an LED assembly mounted to the tray and comprising LED elements that emit light outward away from the tray;
- an elongated lens with a central section configured to extend over the LED assembly and lateral sections on opposing sides of the central section and configured to engage with the tray, the lateral sections comprising an indent that opens outward and is sized to receive the feet of the tray to connect the lens to the housing;
- inner end caps mounted to ends of the housing; and
- outer end caps mounted at the ends of the housing, the outer end caps positioned outward from the inner end caps, the outer end caps being larger than the inner end caps such that the outer end caps extend across the housing, the tray, and the elongated lens.

10. The light strip of claim 9, wherein the lens comprises a concave shape with the central section being curved and having an open side that is aligned with the LED assembly when the lateral sections are mounted to the tray.

11. The light strip of claim 9, wherein the tray further comprises first and second wings and a central section with the wings shaped to match and be positioned against the lateral side walls of the housing with the central section extending across the channel of the housing and with the LED assembly mounted to the central section and away from the first and second wings.

12. The light strip of claim 11, wherein the LED assembly comprises a substrate mounted to the central section of the tray and with the LED elements mounted to the substrate.

13. The light strip of claim 9, wherein the inner end caps are light-transmissive end caps that extend over ends of the lens.

14. The light strip of claim 13, wherein the outer end caps are opaque end caps.

15. A light strip comprising:

a housing with an elongated shape that extends along a longitudinal axis, the housing comprising a channel;

a tray attached to the housing and positioned in the channel;

an LED assembly mounted to the tray and comprising LED elements that emit light outward away from the tray;

an elongated lens with a central section configured to extend over the LED assembly;

inner end caps positioned at ends of the lens, the inner ends caps being light-transmissive; and outer end caps positioned at ends of the housing and along the longitudinal axis of the housing outward from the inner end caps, the outer end caps being opaque.

16. The light strip of claim 15, wherein the inner end caps are smaller than the outer end caps and extend over the ends of the lens and the outer end caps extend over the ends of the lens and the housing.

17. The light strip of claim 15, wherein the housing further comprises end walls that extend across the channel and the inner end caps are aligned along the longitudinal axis with the end walls.

18. The light strip of claim 15, wherein the inner end caps are positioned along the longitudinal axis inward from ends of the housing and the outer end caps abut against the ends of the housing.

19. The light strip of claim 15, wherein the outer end caps are aligned perpendicular to a back wall of the housing.

* * * * *